Figure 2:
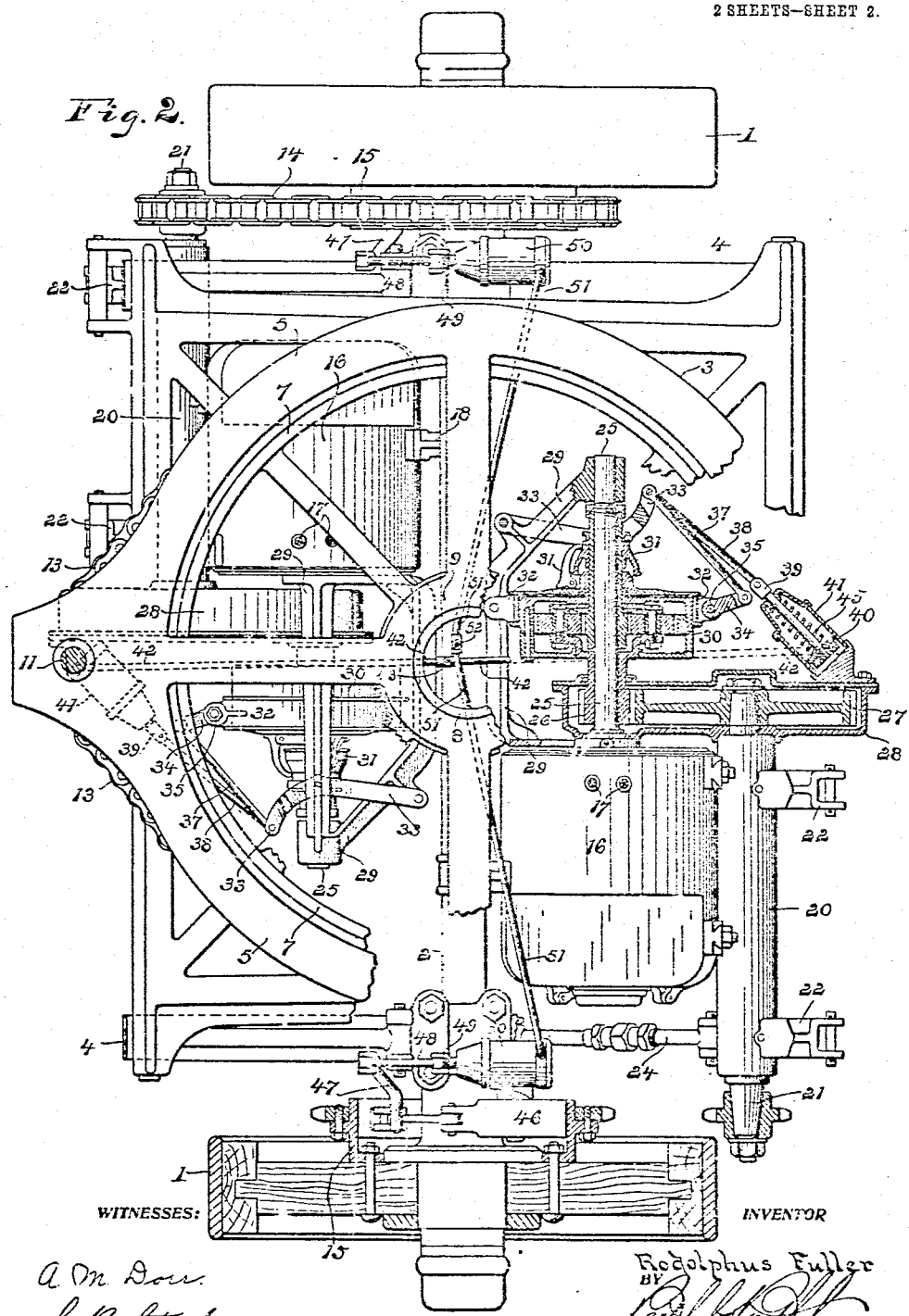

R. FULLER.
MOTOR VEHICLE.
APPLICATION FILED MAR. 8, 1909.
948,317.
Patented Feb. 8, 1910.
2 SHEETS—SHEET 1.
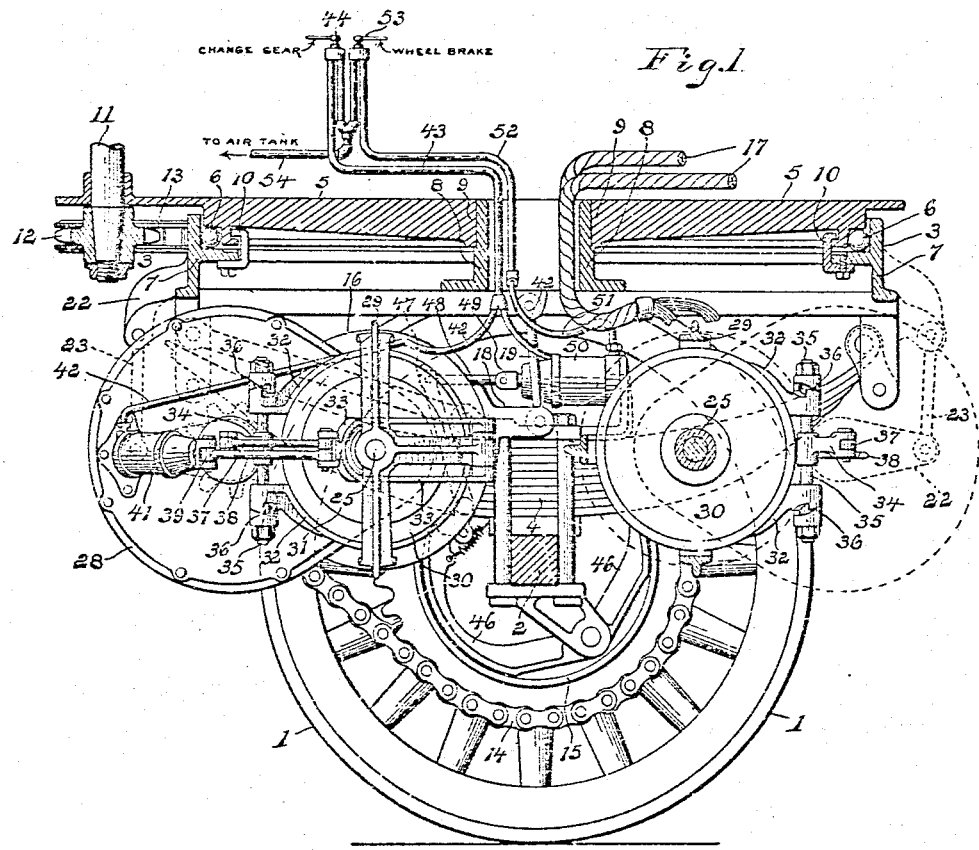
Fig.1
WITNESSES:
INVENTOR
Rodolphus Fuller
ATTORNEYS

R. FULLER.
MOTOR VEHICLE.
APPLICATION FILED MAR. 8, 1909.

948,317.

Patented Feb. 8, 1910.
2 SHEETS—SHEET 2.

WITNESSES:
A. M. Dow.
C. R. Stickney.

INVENTOR
Rodolphus Fuller
BY
ATTORNEYS

UNITED STATES PATENT OFFICE.

RODOLPHUS FULLER, OF DETROIT, MICHIGAN.

MOTOR-VEHICLE.

948,317.  Specification of Letters Patent.  Patented Feb. 8, 1910.

Application filed March 8, 1909. Serial No. 182,047.

*To all whom it may concern:*

Be it known that I, RODOLPHUS FULLER, a citizen of the United States of America, residing at Detroit, in the county of Wayne and State of Michigan, have invented certain new and useful Improvements in Motor-Vehicles, of which the following is a specification, reference being had therein to the accompanying drawings.
This invention relates to improvements in motor vehicles and more especially to two-wheeled trucks for self-propelled vehicles designed to carry heavy loads and of the class shown and described in my application for Letters Patent filed July 27, 1908, Serial No. 445,641.

The object of this invention is to provide certain new and useful features in the construction and arrangement of parts whereby the truck is more evenly balanced and the necessary room secured to install motors and transmissions of desired size.

A further object of the invention is to provide an arrangement and combination of parts whereby a very wide range of speed may be secured so that the motion may be greatly reduced, and thus ample power secured without the necessity for installing high powered motors.
It is also an object of this invention to provide suitable fluid controlled means for operating the change speed gearing and brake mechanism so that the car may be under complete control of the operator at all times without the necessity for any great expenditure of strength or skill.

To this end the invention consists in the construction, arrangement and combination of parts substantially as shown and described, reference being had to the accompanying drawings in which, Figure 1 is a vertical section of a truck embodying the invention; and Fig. 2 a plan view of the same with parts broken away to show the construction.

As shown in the drawings 1, 1, are the driving wheels, and 2 a fixed axle upon which a truck frame or fifth wheel 3 is supported by semi-elliptic springs 4 secured to the axle by suitable clips. The upper member 5 of the fifth wheel or circle is formed with a circular track for a series of balls 6 running upon a similar track on the lower member 7 of the fifth wheel. Each of these members is formed with spokes connecting its circular track with its hub portion, the hub 8 of the lower member being tubular and formed to fit within the bore of the hub 9 of the upper member or circle of the fifth wheel. The upper member of the fifth wheel is held from being lifted from and permitted to turn freely upon the lower member by clips 10 secured to the lower member and engaging a flange upon the upper member.

11 is a steering post mounted upon the upper member of the fifth wheel and provided with a sprocket 12 on its lower end to engage a sprocket chain 13, the ends of which are secured in any suitable manner to the lower member of the fifth wheel to turn the truck relatively to the upper member and steer the vehicle.

Power is transmitted to the driving wheels 1 to propel the vehicle, by means of sprocket chains 14, one for each wheel, each engaging a large sprocket secured to the brake drum 15 which is bolted securely to the spokes of its wheel. Two electric motors 16 are suspended beneath the truck frame and the current is supplied to each of these motors through cables 17 passing upward through the tubular hub of the truck frame to any suitable source of electrical energy (not shown).

In order that the weight of the motor may be more evenly distributed upon the truck, and in order that there may be ample room for hanging the motors and providing each with a suitable variable speed transmission, these motors are suspended at opposite sides of the axle by securing to the frame or casing of each an arm 18 to which is pivotally attached a link hanger 19 at one end and at its upper end to a suitable ear on the truck frame. These hangers pivotally support each motor at one side and secured to the opposite side of each motor casing is a sleeve 20 for a counter-shaft 21 which shaft is provided on its outer end with a sprocket engaged by the sprocket chain 14, and formed integral with this sleeve 20 are two laterally extending arms 22, to the outer ends of which are pivotally attached link hangers 23 pivoted at their upper ends to suitable downwardly extending ears on the truck frame. Each motor is thus supported by hangers at its side of the axle entirely independent of the other motor and each is prevented from swinging upon its hangers and held rigidly in position by a distance rod 24 pivoted at one end to the sleeve and at its opposite end to the axle.

Upon the shaft 25 of each motor is mounted a pinion 26 in mesh with a gear 27 upon the end of the counter shaft 21 and a suitable gear casing 28 is secured to the motor casing and the end of the sleeve 20 to inclose said gears.

A suitable supporting frame 29 is secured to the end of each motor and provided with a bearing for the outer end of the motor shaft 25. Mounted upon the shaft 25 of each motor within this frame 29 is a suitable variable speed planetary gear transmission 30 of the ordinary construction and adapted to transmit motion from the shaft 25 to the pinion 26. Each transmission is provided with a high speed clutch mechanism 31 and a low speed clutch band 32. The clutch mechanism 31 is operated by means of a forked lever 33 pivoted at one end to the frame 29, and intermediate its ends to a collar carried by a sliding member of the clutch mechanism. The clutch band 32 is operated by means of a lever arm 34 secured upon a bolt 35 which passes through and connects the ends of the band. These ends of the band are each provided with a cam 36 engaged by a similar cam secured upon the bolt so that when the bolt is turned by means of the arm 34 the ends of the band will be forced toward each other to clamp the casing of the transmission and hold the same from turning. The lever 33 and arm 34 are connected by a link 37, and pivoted to the lever 33 is a link 38 the opposite end of which is pivotally attached to the outer end of a piston rod 39 attached to a piston 40 movable within a cylinder 41 rigidly secured to the gear casing 28 in such a position that when air under pressure, or other motive fluid is admitted to the cylinder through a suitable pipe 42, the piston rod will be forced outward and actuate the lever 33 and arm 34 to operate the two clutches of the transmission. The pipes 42 lead to the cylinders 41 for operating each transmission, and said pipes join each other in a pipe 43 which extends upward through the tubular hub 8 of the truck to a suitable valve 44 located in any convenient place to be operated by the hand of the driver. Each piston 40 is returned to normal position when the air is permitted to escape from the cylinders, by a spring 45 within each cylinder behind the piston. This spring operates to throw the clutch mechanism 31 out of operation and the clutch band into operation and thus if there should be any leak in the air system the spring would always throw the transmissions into slow speed.

The speed of the truck is reduced through the gears 26 and 27 and the sprockets and driving chains 14 and by interposing the change speed gearing between the motor shaft 25 and pinion 26 a greater reduction in speed may be had and thus great power applied to the truck wheels without the necessity for installing high powered motors.

By arranging the motors on opposite sides of the axle, the truck is not only more evenly balanced, but ample room is provided for the extension of the motor shafts and the installation of the transmissions directly upon said shafts.

Within the brake drum of each wheel are brake shoes 46 of any suitable form and construction and adapted to be operated by suitable mechanism embodying a lever 47 to the upper end of which is attached a link 48 connecting said lever and a piston rod 49 movable within a cylinder 50 to which air under pressure or other motive fluid is supplied through a pipe 51. These pipes 51 lead from the cylinders 50 adjacent to each driving wheel toward the center of the truck where they join in a pipe 52 extending upward through the hub 8 to a valve 53 adjacent to the valve 44. The valves 44 and 53 are supplied with air under pressure through a pipe 54 leading therefrom to a suitable air tank (not shown) located at any convenient point on the vehicle.

Trucks of this character being very heavy, considerable power is required to set the brakes and stop the vehicle. With this system of control the operator with slight effort on his part may set the brakes and stop the car at will and the operation of the change speed gearing is accomplished without the use of a multiplicity of heavy cumbersome levers.

By carrying the air pipes up through the tubular hub of the fifth wheel the truck may be turned freely in any direction without interfering with the connections, and this arrangement permits of the carrying of the entire power plant and operating mechanism upon the truck frame adjacent to the axle between the driving wheels of the truck.

What I claim as my invention is:—

1. In a truck for motor vehicles, the combination of a truck frame, an axle, driving wheels on said axle, a motor located at one side of the axle adjacent to one wheel with its shaft extended toward the other wheel, a second motor located at the opposite side of the axle adjacent to the other wheel with its shaft extended toward the wheel at the opposite side of the truck, variable speed transmission mechanism located upon the extended end of each motor shaft, a pinion on each motor shaft actuated by each transmission mechanism, a counter shaft adjacent to each motor with one end extending toward the adjacent truck wheel, means for transmitting motion from each of said counter shafts to said wheels, and a gear on the opposite end of each counter shaft to engage said pinions.

2. In a truck for motor vehicles the combination of a truck frame, an axle, driving wheels on said axle, a motor carried by the frame at each side of the axle and each having its shaft extended longitudinally of the axle, a supporting frame secured to the end of each motor and provided with a bearing for the end of the extended shaft, and transmission mechanism upon the extended end of each motor shaft within said frames, a pinion upon each motor shaft between said transmission mechanism and the motor adapted to receive motion from the shaft through said mechanism, a counter shaft secured to one side of each motor, a gear on one end of each of said counter shafts to engage the said pinions, a sprocket on the opposite end of each of said counter shafts, and sprocket chains engaging said sprockets to transmit motion to the truck wheels.

3. In a truck for motor vehicles, the combination of a truck frame provided with an upper and a lower circular member forming a fifth wheel, a tubular hub for said fifth wheel, a motor carried beneath the frame, means for transmitting motion from said motor to the wheels of the truck, a variable speed transmission mechanism to transmit motion from the motor to said means and provided with clutches operating to vary the speed, a cylinder, a piston in said cylinder, means connecting the piston and the clutches to operate the latter by the movement of the former, a conduit for fluid under pressure leading to said cylinder and extending upward through the tubular hub, and means for controlling the flow through said conduit located above the truck frame.

4. In a motor vehicle, the combination of a truck frame, an axle, driving wheels on the axle, a motor supported below the frame, variable speed transmission mechanism for transmitting motion from the motor and embodying a high speed clutch and a low speed clutch, connected levers operating said clutches, a cylinder, a piston in said cylinder having a piston rod connected to operate said levers by the movement of the piston, a conduit for fluid under pressure leading to the cylinder to actuate the piston in one direction, a spring within the cylinder to actuate the piston in the opposite direction and hold the same in normal position, said levers being so arranged that when the piston is in normal position the high speed clutch will be thrown out of operation and the low speed clutch into operation.

5. In a truck for motor vehicles, the combination of a truck frame, an axle, driving wheels on the axle, a motor detachably suspended beneath the truck frame at one side of the axle and having an extended shaft, a supporting frame secured to the motor and provided with a bearing for the end of the extended shaft, variable speed transmission mechanism mounted upon the extended shaft within the frame and embodying a high speed clutch and a low speed clutch, a pinion on the motor shaft between the transmission mechanism and the motor, a sleeve secured to one side of the motor, a counter shaft within said sleeve, a gear on the end of the counter shaft engaging the pinion on the motor shaft, a gear casing surrounding said gears, a cylinder for fluid under pressure secured to the gear casing, levers for operating the clutches of the transmission mechanism, a link connecting said levers to operate the same, and a conduit for fluid under pressure leading to said cylinder.

In testimony whereof I affix my signature in presence of two witnesses.

RODOLPHUS FULLER.

Witnesses:
OTTO F. BARTHEL,
ANNA M. DORR.